United States Patent

Wakui et al.

Patent Number: 5,295,251
Date of Patent: Mar. 15, 1994

[54] METHOD OF ACCESSING MUTLIPLE VIRTUAL ADDRESS SPACES AND COMPUTER SYSTEM

[75] Inventors: Fujio Wakui; Takahiro Onitsuka, both of Hadano; Izumi Nozaki, Zama; Toshinori Kuwabara, Hadano, all of Japan

[73] Assignees: Hitachi, Ltd., Chiyoda; Hitachi Computer Engineering Co., Ltd., Hadando, both of Japan

[21] Appl. No.: 585,973

[22] Filed: Sep. 21, 1990

[30] Foreign Application Priority Data

Sep. 21, 1989 [JP] Japan .................. 1-245453

[51] Int. Cl.⁵ .................. G06F 12/00; G06F 12/10
[52] U.S. Cl. .................. 395/400; 364/DIG. 1; 364/DIG. 2
[58] Field of Search .................. 395/400

[56] References Cited

U.S. PATENT DOCUMENTS

| | | | |
|---|---|---|---|
| 4,355,355 | 10/1982 | Butwell et al. | 395/400 |
| 4,456,954 | 6/1984 | Bullions, III et al. | 395/400 |
| 4,459,661 | 7/1984 | Kaneda et al. | 395/400 |
| 4,521,846 | 6/1985 | Scalzi et al. | 395/400 |
| 4,733,350 | 3/1988 | Tone et al. | 395/400 |
| 4,779,188 | 10/1988 | Gum et al. | 395/400 |
| 4,802,084 | 1/1989 | Ikegaya et al. | 395/400 |
| 4,812,969 | 3/1989 | Takagi et al. | 395/400 |
| 4,816,991 | 3/1989 | Watanabe et al. | 395/400 |
| 4,945,480 | 7/1990 | Clark et al. | 395/700 |
| 4,979,098 | 12/1990 | Baum et al. | 395/400 |
| 4,985,828 | 1/1991 | Shimizu et al. | 395/400 |
| 5,008,811 | 8/1991 | Scalzi et al. | 395/400 |
| 5,023,773 | 6/1991 | Baum et al. | 395/400 |
| 5,129,071 | 7/1992 | Yamagata et al. | 395/400 |

Primary Examiner—Joseph L. Dixon
Assistant Examiner—Michael A. Whitfield
Attorney, Agent, or Firm—Antonelli, Terry, Stout & Kraus

[57] ABSTRACT

A computer system operable as a virtual machine system capable of accessing multiple virtual address spaces, which has an access register translation means for translating a space identifier into an origin address of a table for address translation and a translation pair memory for storing translation pairs of the space identifiers and the associated origin addresses. In each entry of the translation pair memory, a field is provided in association with the translation pair, for storing a machine identifier of the guest virtual machine associated with the translation pair. When accessing a virtual address space, a guest virtual machine makes reference only to the associated translation pair based on the virtual machine identifier thereof.

10 Claims, 1 Drawing Sheet

METHOD OF ACCESSING MULTIPLE VIRTUAL ADDRESS SPACES AND COMPUTER SYSTEM

BACKGROUND OF THE INVENTION

1. Field of the Invention This invention relates generally to a data processing system in which a program being executed in a guest virtual computer accesses plural space operands concurrently, and more particularly to a method of accessing multiple virtual address spaces by means for storing translation pairs each consisting of a space identifier (hereinafter called "space iD") and a translation pair of an origin address.

2. Description of the Related Art

Conventionally, in data processing systems employing virtual addressing in multiple virtual storage spaces, the range which can be designated by an instruction with a logical address obtained by using, for example, a general register is called "a virtual address space". From this virtual address space and a logical address, a real storage address is given by a computer system. The operation to obtain a real address from a virtual address space and a logical address is called "address translation". This address translation is performed, for every virtual address space, by using address translation tables (i.e., a segment table and a page table) predetermined by the computer system.

The address translation tables exist on a main storage, and its origin address (STO: Segment Table Origin address) is given for every virtual address space. Address translation from a logical address into a real address is performed by referring to the address translation tables by using the origin address STO.

Further, for determining an address space from multiple virtual address spaces, a space iD is designated by a base access register corresponding to a base register to be used in computing an operand logical address of an instruction, and the STO corresponding to this space iD can be obtained by means for referring to the tables provided in the computer system. This prior art is exemplified by Japanese Patent Publication No. 41379/1985 and its corresponding U.S. Pat. No. 4,521,846.

For more advanced prior art, a method was proposed in which a translation pair of a space iD and STO are prestored in hardware when a base access register is used for memory accessing.

In this prior art, when an ordinary memory access instruction, e.g., an L (load) instructions is inputted in an instruction register, a base register is selected from the general registers, for calculating a logical address of an operand according to four bits of a base register number field, and at the same time, a base access register paired with the base register is selected, thereby determining STO. Specifically, using a space iD in the base access register, reference is made to a memory in which translation pairs of space iDs and STOs are stored, and an STO corresponding to the space iD of an operand is readout, whereupon the logical address of the operand is translated into a real address based on the STO to access a buffer storage or a main storage. If a desired translation pair consisting of the space iD and the STO is not stored in the translation pair memory, it is possible to obtain the STO by operating an access register translation table in the main storage by hardware (this is called "access register translation"). After this access register translation, a buffer storage or a main storage are accessed in the same manner as discussed above.

In such processing, when a translation table defining the translation of the space iD and the STO is altered, there is a possibility that a translating pair consisting of the space iD and the STO before the alteration could be stored in the translation pair memory. For this reason, there is prepared an instruction by which the translation pair stored in the translation pair memory is invalidated.

With the above-mentioned prior art, when a reference is made to a translation pair memory of space iDs and STOs by a given space iD during operation of a guest virtual computer in a virtual computer system, there is a possibility to read a translation pair, though with the same space iD, which was stored by a host or other guest virtual computer other than the guest virtual computer. If real address translation is performed with this STO, a wrong access to a buffer storage or a main storage would be carried out.

Consequently, at the start or termination of operation of the guest virtual computer, the host computer must issue an instruction for invalidating the whole translation pair memory or must exclusively allocate the space iD to the host computer and the individual guest virtual computers.

However, in the former method, the translation processes of space iDs to STOs are increased due to the invalidation of the translation pair memory, while in the latter method, the exclusive allocations of the space iD to be performed by the host computer would degrade the performance of the system. Further, when the instruction for invalidating the translation pair memory is issued during operation of the guest virtual computer, even the translation pairs stored by the host and other guest virtual computers would be invalidated. As a result, also in the host and other guest virtual computer, the translating process of the space iD to the STO would increase, thus degrading the performance.

SUMMARY OF THE INVENTION

It is therefore an object of this invention to provide a method of accessing multiple virtual address spaces, and a computer system, in which entries of a translation pair memory storing translation pairs of space iDs and STOs can exclusively be utilized between a host computer and the guest virtual computers, without exclusively allocating the space iD, thereby avoiding degradation performance resulting from the unnecessary invalidating process in the translation pair memory.

Another object of the invention is to provide a method of accessing multiple virtual space addresses, and a computer, in which it is possible to avoid performance degradation which is cause by invalidating translation pairs of the host computer or other guest virtual computer due to the invalidating process in the translation pair memory by the guest virtual computer.

According to a first aspect of the invention, there is provided a method of accessing multiple virtual address spaces in a computer system including access registers each for retaining a space identifier in association with a general register usable as a base register, an access register translation means for translating the space identifier, which is retained in the access register, into an origin address for address translation, and a translation pair memory for storing translation pairs of the space identifiers, which were subjected to the translation, and the origin addresses as the results of the translations, the method comprising the steps of: providing a field for storing a machine identifier in each entry of the translation pair memory; storing a translated machine identifier of a guest virtual machine in the field in association with a translation pair of the space identifier and the origin address; and making reference for each guest virtual machine to the translation pair associated with the guest virtual machine.

Preferably, the associated translation pair in the translation pair memory is invalidated for the associated guest virtual machine.

According to a second aspect of the invention, there is provided a method of accessing multiple virtual address spaces in a computer system including access registers for retaining a space identifier in correspondence with a general register usable as a base register, an access register translation means for translating the space identifier, which is retained in the access register, into an origin address for address translation, and a translation pair memory for storing translation pairs of the space identifiers, which were subjected to the translation, and the origin addresses as the results of the translations, said method being characterized in that each entry of the translation pair memory is exclusively used for guest virtual machines.

According to a third aspect of the invention, there is provided a computer system operable as a virtual machine system capable of accessing multiple virtual address spaces, the computer system comprising: access registers, each of which is provided in association with a general register usable as a base register, each for retaining a space identifier; an access register translation means for translating the space identifier, which is retained in said access, register, into an origin address for address translation; a translation pair memory for storing translation pairs of the translated space identifiers and the associated origin addresses; and storage areas each for storing a machine identifier of a guest virtual machine in association with each translation pair in said translation pair memory.

According to a fourth aspect of the invention, there is provide a computer system operable as a virtual machine system capable of accessing multiple virtual address spaces, the computer system comprising: access registers, each of which is provided in association with a general register usable as a base register, each for retaining a space identifier; an access register translation means for translating the space identifier, which is retained in said access register, into an origin address for address translation; means for retaining a machine identifier of a guest virtual machine during operation of the guest virtual machine; storage areas each for storing the machine identifier in association with each translation pair in the translation pair memory; means for causing one of said storage areas to store the machine identifier of the guest virtual machine, which is retained in said retaining means, when the translation pair is stored in said retaining means, when the translation pair is stored in said translation pair memory; and means for detecting whether or not the translation pair with the machine identifier of the guest virtual computer is stored in said translation pair memory in association with space identifier given in operation of the guest virtual machine.

Preferably, the computer system of the fourth arrangement may further comprise: designating means for sequentially designating entries of said translation memory, for said translation pair memory, when a invalidating stored translation pair; discriminating means for discriminating whether or not the machine identifier of the entry designated by the designating means coincides with the machine identifier of the guest virtual computer which identifier is to be invalidated; and means for invalidating the translation pair only for the entry which the coincidence was detected by said discriminating means.

In either the method or system of this invention, the machine identifier may include an identifier of a host computer.

In operation, when the virtual computer system is operated, the translation pair memory is exclusively used between the host computer and the individual guest virtual computers to store translation pairs and to be referred to. Therefore, each guest virtual computer can invalidate only the translation pair stored by the guest virtual computer in the translation pair memory, without invalidating all the translation pairs stored in the translation pair memory at the start or termination of operation of the guest virtual computer by the host computer and without exclusively controlling the space iD by the host computer. It is thereby possible to improve the processing performance of a host or other guest virtual computers.

The above and other advantages, features and additional objects of this invention will be manifest to those versed in the art upon making reference to the following detailed description and the accompanying drawings in which a preferred embodiment incorporating the principles of this invention is shown by way of illustrative example.

DETAILED DESCRIPTION OF THE PREFERRED EMBODIMENT

Figure 1:
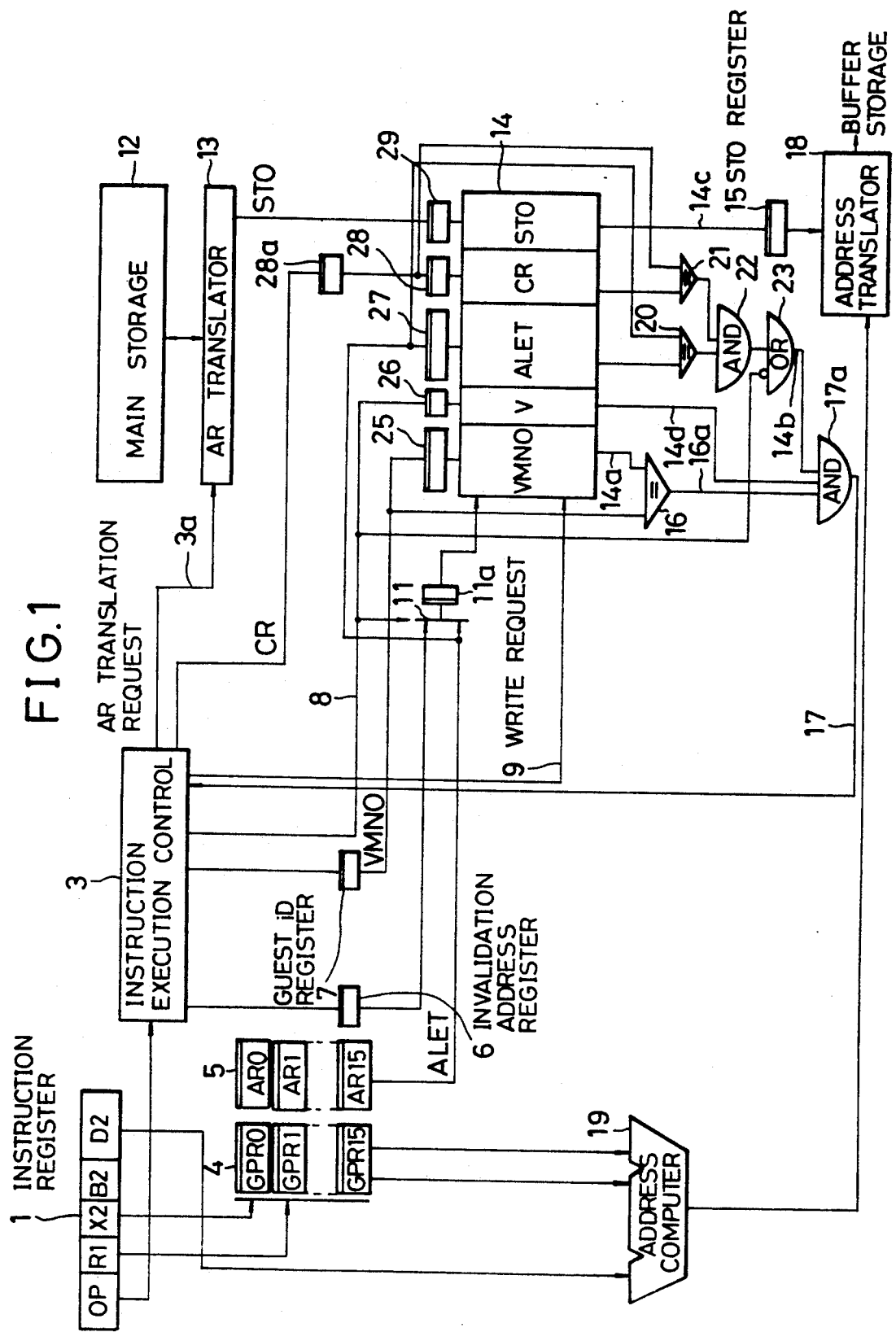
FIG. 1 is a block diagram of an embodiment according to the present invention.

The principles of this invention are particularly useful when embodied in a computer system such as shown in FIG. 1.

In FIG. 1, reference numeral 1 designates an instruction register; 3, an instruction execution control unit; 4, group of general registers (GPRs); 5, a group of access registers (ARs); 6, an invalidation address register; 7, a guest identifier (guest iD) register; 11, a translation pair memory address selector; 12, a main storage; 13, an access register (AR) translator; 14, a translation pair memory (ALB); 15, an origin address (STO) register; 16, a guest iD (VMNO) coincidence detecting circuit; 18, an address translator; 20 and 21, coincidence detecting circuits; 17a, 22 and 23, gates; and 25-29, a group of registers.

When an instruction for starting a guest virtual computer (hereinafter called "guest") is set in the instruction register 1, the instruction execution control unit 3 sets in the guest iD register 7 a value which distinguishes the guest from the host computer and other guests, in association with the peculiar information of the started guest. Subsequently, the started guest executes the instruction, which is set in the instruction register 1, until a guest termination request is issued.

Upon issuance of the guest termination request, the instruction execution control unit 3 sets in the guest iD register 7 a value indicative of operation of the host, and executes a host program until the next guest start request is issued.

In the instruction register 1, for instance, an RX-type instruction (e.g., L instruction) is set. The contents of the general registers 4 selected by the B2 and X2 fields and the content of the D2 field are inputted to an address computer 19 to obtain a logical address of an operand. The obtained logical address is then inputted to the address translator 18 for being translated into a real address. On the other hand, the space iD (hereinafter called "ALET") retained in the access register corresponding to the general register 4 selected by the B2 field of the instruction is readout, and is set in address register 11a via the translation pair memory address selector 11. The thus set ALET will be an address for making reference to the translation pair memory (ALB) 14.

The translation pair memory address selector 11 is controlled by a signal 8 to be '0' only when an instruction for invalidating a translation pair stored in the translation pair memory 14 is being executed, and selects ALET from the access register 5 with the signal 8 of '1' when an ordinary instruction other than the invalidation instruction is being executed.

A desired translation pair if stored is read from the translation pair memory (ALB) 14, to which the ALET was inputted as a reference address, and is set in the STO register 15 as the STO via a signal line 14c.

Further, the VMNO which caused the translation pair to be stored is read via a signal line 14a and is inputted to the VMNO coincidence detecting circuit 16. This circuit 16 also receives an output from guest iD register 7 to be compared with the VMNO.

A signal line 14b carries the output of the AND circuit 22 which passed the OR circuit 23. This output will be '1' if both the output of the ALET coincidence detecting circuit 20, which detects the coincidence between the ALET and the read ALET, and the output of the CR (control register) coincidence detecting circuit 21, which detects the coincidence between the CR of the CR register 28a and the read CR, are '1'.

This signal line 14b is inputted to the AND circuit 17a along with the output signal line 16a from the VMNO coincidence detecting circuit 16 and the output signal line 14d of the data (V bit) which will be '1' when the data read from the translation pair memory 14 (ALB) is valid. In other words, if the translation pair to be, obtained is present in the translation pair memory (ALB) 14 and if it is stored by the same guest, the output signal 17 of the AND circuit 17a will be '1' and will be transmitted to the instruction execution control unit 3. The instruction execution control unit 3 causes the STO, which was set in the STO register 15, and the logical address obtained by the address computer 19 to be applied to the logical address translator 18 to thereby obtain an operand real address so that a buffer storage or a main storage is accessed with the operand real address.

On the contrary, if the to-be-obtained translation pair is neither present in the translation pair memory (ALB) 14 at the referred to address nor is stored by the same guest, this fact is notified to the instruction execution control unit 3 via a signal line 17. In response to this, the instruction execution control unit 3 dispatches an AR translation start request to the AR translator 13 via the signal line 3a to obtain an STO corresponding to the ALET.

In response to this start request, the AR translator 13 obtains the STO by operating accessing the AR translation table in the main storage 12 and writes this STO into the register 29 in the group of write registers 25-29 for the translation pair memory 14. ALET and CR used by the process of AR translation will be set in the registers 27 and 28, respectively.

Further, VMNO when the AR translation start request is dispatched will be set in the register 25, and the value of the signal line 8, which is to be '1' during execution of an ordinary instruction, will be set in the register 26. When all data have been set in the write registers 25-29, a write request for writing in the translation pair memory (ALB) 14 is issued from the instruction execution control unit 3 via a signal line 9, and data of the write registers, 25-29 are stored in the translation pair memory 14.

Upon completion of this storing, detection of coincidence is notified to the instruction execution control unit 3 via the signal line 17, and subsequently, the buffer storage or the main storage is likewise accessed with the obtained operand real address.

Thus, it has become possible to use entries of the translation pair memory (ALB) 14 exclusively between the host and the individual guests.

The operation of a P (purge) instruction for invalidating translation pairs stored in the translation pair memory 14 in a guest will be described also in connection with FIG. 1.

When the P (purge) instruction is set in the instruction register 1 during operation of a guest, the instruction execution control unit 3 sets an initial value in the invalidation address register 6 and causes the signal line 8 to be '0' so that the translation pair memory address selector 11 selects the invalidation address register 6. The value '1' which is the inverted value of the signal line 8 is applied to the input of the OR circuit 23, and '1' is outputted onto the output signal line 14b With the initial value, which is set in the invalidated address register 6, used as a reference address to the translation pair memory (ALB) 14, VMNO is readout onto the signal line 14a and is outputted, along with the output of the guest iD register 7, to the VMNO coincidence circuit 16 where these two outputs are compared. The output signal line 16a as the result of this comparison and the output signal 14d of the V bit, which will be '1' when the data read from the translation pair memory (ALB) 14 is valid, are inputted to the AND circuit 17a. On the contrary, since the signal line 14b is '1' during execution of the P instruction, when both the two signal lines 16a and 14d are '1' detection of coincidence in the AND circuit 17a is transmitted to the instruction execution control unit 3 via the signal line 17. In response to this, the instruction execution control unit 3 dispatches a write request to the translation pair memory (ALB) 14 via the signal line 9. At that time, the value '0' of the signal line 8 has already been set in the register 26, and therefore, the V bit will be set to '0' so that the entry designated by the reference address will be invalidated.

Subsequently, the instruction execution control unit 3 sets in the invalidation address register 6, a value obtained by adding a predetermined value to the initial value and the foregoing process is repeated.

In this process, when an inconsistency of the two VMNO is detected by the VMNO coincidence detecting circuit 16, this fact is notified to the instruction execution control unit 3 via the signal line 17. In the instruction execution control unit 3, a value obtained by further adding a predetermined value to the above resulting value is set in the invalidation address register 7, without dispatching a write request for invalidating, and then the process continues in order.

When the value of the invalidation address register 6 coincides with the maximum value of the reference address of the translation pair memory 14, the instruction execution control unit 3 causes the signal line 8 to be, '1' to terminate execution of the P instruction.

Thus, partial invalidation can be realized such that only the translation pairs stored in the translation pair memory 14 by the guest is invalidated.

In the illustrated embodiment, although updating of the invalidation address register 6 and a write request due to detection of coincidence of VMNOs are performed by the instruction execution control unit 3, the translation pair memory (ALB) 14 may have hardware to perform such procedures so that it is enough for the execution control unit 3 to perform only start and termination procedures of the invalidating process.

Further, in execution of the invalidating instruction in the host computer, a write request for invalidation can be issued always, irrespective of the value of the VMNO coincidence detection signal 17, so that every translation pair stored in the translation pair memory 14 can be invalidated.

In addition, in the illustrated embodiment there, is disclosed a single (one row) translation pair memory this invention should by no means be limited to this specific example but may be applied to the case in which plural (two or more rows) translation pair memories are used.

According to this invention, each entry of the translation pair memory storing the translation pair consisting of the space iD and the STO can be used exclusively between the host and the individual guests, without the necessity of exclusively allocating the space iD, so that degradation of performance resulting from an unnecessary invalidating process in the translation pair memory can be avoided.

Further, degradation of performance due to the invalidating of translation pairs of host or other guests in the translation pair memory, which originally did not need to be invalidated in the invalidating process by the guest, can be avoided.

What is claimed is:

1. A method of accessing multiple virtual address spaces in a computer system including a plurality of access registers each for retaining a space identifier in association with a general register usable as a base register; access register translation means for translating a space identifier, which is retained in an access register, into an origin address for address translation; and a translation pair memory for storing translation pairs each including a space identifier, which was subjected to translation by the access register translation means, and an origin address obtained from said access register translation means, and for supplying said origin address, in response to a space identifier received from an access register, to a virtual-physical address translator, the method comprising the steps of:
    (a) providing a field for storing a machine identifier in each entry of the translation pair memory;
    (b) storing a translated machine identifier of a guest virtual machine in the field in association with a translation pair of a space identifier and an origin address; and
    (c) making reference to said translation pair memory for each guest virtual machine to access a translation pair associated with the guest virtual machine using a space identifier obtained, from an access register.

2. A method according to claim 1, further comprising the step of invalidating a translation pair in the translation pair memory associated with a particular guest virtual machine by accessing the translation pair memory using sequentially generated invalidation addresses and invalidating those entries of the translation pair memory which contain a machine identifier corresponding to the machine identifier of said particular quest virtual machine.

3. A method according to clam 1, wherein the field for storing the machine identifier in the translation pair memory is also used for storing an identifier of a host computer.

4. A computer system operable as a virtual machine system capable of accessing multiple virtual address spaces in a computer system comprising a plurality of access registers, each for retaining a space identifier in correspondence with a general register usable as a base register; access register translation means for translating a space identifier, which is retained in an access register, into an origin address for use in virtual-physical address translation; and a translation pair memory accessible in response to a space identifier for storing translation pairs, each including a space identifier, which was subjected to translation by said access register translation means, and an origin address, and for supplying said origin address upon access by the space identifier of the translation pair, wherein each entry of the translation pair memory is exclusively used for a respective one of a plurality of guest virtual machines for supplying to a virtual-physical address translator an origin address accessed in response to an applied space identifier.

5. A computer system operable as a virtual machine system capable of accessing multiple virtual address spaces, the computer system comprising:
    (a) a plurality of access registers for retaining respective space identifiers, each access register being provided in association with a general register usable as a bass register;
    (b) access register translation means for translating a space identifier, which is retained in an access register, into an origin address for use in virtual-physical translation;
    (c) a translation pair memory, accessible in response to a space identifier received from an access register, for storing translation pairs, each including a translated space identifier and an associated origin address and for supplying an origin address when accessed by a space identifier, said translation pair memory also having storage areas each for storing a machine identifier of a guest virtual machine which is accessible in association with each translation pair.

6. A computer system according to claim 5, wherein the machine identifier includes an identifier of a host computer.

7. A computer system operable as a virtual machine system capable of accessing multiple virtual address spaces, the computer system comprising:
    (a) a plurality of access registers for retaining respective space identifiers, each access register being provided in association with a general register usable as a base register;
    (b) access register translation means for translating a space identifier, which is retained in an access register, into an origin address for address translation;
    (c) means for retaining a machine identifier of a guest virtual machine during operation of the guest virtual machine;
    (d) a translation pair memory, accessible in response to a space identifier received from one of said access registers, for storing translation pairs, each including a translated space identifier and an associated origin address obtained from said access register translation means and for supplying an origin address to a virtual-physical address translator when accessed by a space identifier, said translation pair memory also having storage area each for storing a machine identifier in association with each translation pair;

(e) means for causing one of said storage areas to store the machine identifier of the guest virtual machine, which is retained in said retaining means, when the associated translation pair is stored in said translation pair memory; and (f) means for detecting whether or not a translation pair with the machine identifier of the guest virtual machine is stored in said translation pair memory in association with the space identifier given in an operation of the guest virtual machine, by comparing the space identifier in the stored translation pairs associated with the machine identifiers of the quest virtual machine with the space identifier in said retaining means.

8. A computer system according to claim 7, further comprising:

(a) designating means for sequentially designating entries of said translation pair memory, when invalidating a stored translation pair, using sequentially generated invalidation addresses to access said translation pair memory;

(b) discriminating means for discriminating whether or not the respective machine identifier of the entries designated by the designating means coincide with machine identifiers of guest virtual machines which identifiers are to be invalidated; and (c) means for invalidating the translation pair only for the entry for which coincidence is detected by said discriminating means.

9. A computer system according to claim 7, wherein the machine identifier includes an identifier of a host computer.

10. A computer system according to claim 8, wherein the machine identifier includes an identifier of a host computer.

* * * * *